United States Patent [19]

Kuehnle

[11] 4,173,407

[45] Nov. 6, 1979

[54] ELECTROPHOTOGRAPHIC CONTACT DUPLICATING APPARATUS AND METHOD

[75] Inventor: Manfred R. Kuehnle, Lexington, Mass.

[73] Assignee: Coulter Information Systems, Inc., Bedford, Mass.

[21] Appl. No.: 842,361

[22] Filed: Oct. 14, 1977

Related U.S. Application Data

[63] Continuation of Ser. No. 641,073, Dec. 15, 1975, abandoned, which is a continuation-in-part of Ser. No. 397,310, Sep. 14, 1973, Pat. No. 3,951,541.

[51] Int. Cl.² ............................................. G03G 15/00
[52] U.S. Cl. ....................................... 355/12; 430/31; 355/16
[58] Field of Search ............... 355/12, 16, 3 R, 3 CH, 355/14; 96/1 R, 1 PC

[56] References Cited

U.S. PATENT DOCUMENTS

| | | | |
|---|---|---|---|
| 2,956,487 | 10/1960 | Giaimo | 355/14 |
| 3,579,332 | 5/1971 | Williams | 96/1.8 |
| 3,796,570 | 3/1974 | Comeau | 96/1 R |
| 3,876,300 | 4/1975 | Washio et al. | 355/12 |

Primary Examiner—R. L. Moses
Attorney, Agent, or Firm—Silverman, Cass & Singer, Ltd.

[57] ABSTRACT

Apparatus in which the photographic images on a strip roll of silver halide film are duplicated upon a strip roll of electrophotographic film. The apparatus feeds the strips of the two rolls into contact with one another, emulsion side of the photographic film against the coating side of the electrophotographic film. At the projection station there is a projected light beam passing through the contacting films. A charging station is provided for charging the electrophotographic film just before it contacts the photographic film and a toning station and a fixing station respectively are located to act upon the electrophotographic film after exposure.

Alternatively, the toned image may be transferred to a strip of clear base film from the coated surface of the electrophotographic film followed by fixing of the transferred image. The electrophotographic film then is reused while the clear base film becomes the duplicate of the original.

The method involves the use of an electrophotographic film which will not lose charge by virtue of contact or by static electricity because of the separation of the films after contact. The electrophotographic film is coated with a very thin layer of insulating hydrocarbon before the contact occurs to prevent static discharge when the films separate and for other reasons.

Background density of the original film is measured by photometric means and compared with preset density standards or used to adjust the sensitivity of the electrophotographic film through charging to provide optimum duplicated quality.

39 Claims, 2 Drawing Figures

Fig. 2

ELECTROPHOTOGRAPHIC CONTACT DUPLICATING APPARATUS AND METHOD

CROSS-REFERENCE TO RELATED APPLICATION

This is a continuation of application Ser. No. 641,073 filed Dec. 15, 1975, now abandoned, which is a continuation-in-part of my application entitled DUPLICATOR PROCESSOR, Ser. No. 397,310, filed Sept. 14, 1973 now U.S. Pat. No. 3,951,541 and assigned to the same assignee.

FIELD OF THE INVENTION

The field of this invention is duplicating apparatus in which it is desired to make a copy of a roll of exposed and developed film onto another roll. The invention is concerned particularly with the transfer of the images from conventional silver halide photographic film to a type of electrophotographic film. These images may be transferred subsequently from the electrophotographic film to a clear base film.

BACKGROUND OF THE INVENTION

Apparatus for duplicating long strips of film onto other strips of film is known. The use of this apparatus is common in the movie industry where the technique is used to make copies of movies for wide distribution. Other fields utilize apparatus for the same general purpose.

Electrophotographic film is advantageous because it need not be kept in darkness and usually is not as perishable as photographic film. Further, it can be developed quickly with less chemical steps and critical processes than required for photographic film. Commercially available electrophotographic coatings have disadvantages which have prevented their use in lieu of photographic film, and among these are:
1. They are not available in strip form capable of being handled in reels.
2. They are slower than photographic film to a degree that requires a great deal of time to make duplicates of long strips.
3. They have less resolution than photographic film.
4. They cannot retain their charge and latent image if moved in contact with other surfaces such as those of photographic films.
5. Static electricity generated as films separate destroys the latent image.
6. They are not transparent.

In the copending application the same electrophotographic film is used to receive the duplicate images from photographic film but the films are not in contact, necessitating optical trains, slits, focussing, etc. The films move in directions opposite to one another. The films being spaced from one another, there are no problems of erasing the latent image from the surface of the electrophotographic film during transportation of the films through the apparatus, but the sharpness of the transfer and the accuracy thereof over a wide area are dependent upon the quality of the optical train. In the case of images whose dimensions must be accurately preserved, this poses difficulties which are solved, if at all, by expensive optical systems.

Contact printing is much more economical and results in higher quality. It was not known until the invention herein that contact printing of electrophotographic film could be effected without erasing the latent image since all known electrophotographic members have been incapable of having a latent image made thereon by direct contact with a conventional film negative. Some complex members have been evolved which have succeeded in obtaining contact transfer but these have not been commercially successful and do not have quality equivalent to photographic film. Further, they are quite expensive and necessitate the use of complex apparatus and are very slow.

The invention revolves around electrophotographic film which has none of these disadvantages and has many unique advantages which enable its use to receive and reproduce the projected images from electrophotographic film in a contact printer.

Once it has been imaged, conventional silver halide film is altered permanently and no longer can be used. This is because in developing the entire emulsion coating is changed permanently chemically. Electrophotographic coatings are not changed physically by imaging with electrostatic images that are latent and represent merely the distribution of electrical charges thereon. Accordingly, unless fixed by causing permanent adherence to electrophotographic film, developed images can be transferred or removed and the electrophotographic film reused.

Electrophotographic films as contemplated for use in the invention have characteristic colors which, while normally not objectionable, nevertheless are annoying when the film has been imaged and is to be used for projection. Accordingly, the invention utilizes the property of the electrophotographic film which enables transfer of the toned image to a clear base film, which also makes the electrophotographic film available for reuse.

Additional background is contained in said copending application and is incorporated herein by reference.

SUMMARY OF THE INVENTION

Apparatus comprising a contact printer arranged to receive elongate members of photographic strip film and electrophotographic strip film and bring them together in face to face contact while passing through a station where light is projected through the contacted films to effect transfer of the images from the photographic film onto the electrophotographic film.

The photographic film is film which has been exposed and developed; the electrophotographic film is unexposed film which is charged in darkness before entering the projection station and toned after passing through the projection station. The apparatus includes means to control the surface potential of the charged electrophotographic film in accordance with the average density of the image on the photographic film to vary the sensitivity of the electrophotographic film in accordance with such density for best quality.

The electrophotographic film comprises a substrate of thin, flexible, transparent polyester having an ohmic layer deposited on one surface, the ohmic layer being wholly inorganic, and a photoconductive coating on top of the ohmic layer. The photoconductive coating is a wholly inorganic material that has been sputtered on the ohmic layer. It is transparent and flexible, has a higher quantum efficiency than any known photoconductor, is extremely dense and has an abrasion-resistant surface. In forming the coating, highly oriented crystals of the inorganic material are grown, arranged with their long axes parallel to one another and perpendicular to the surface of the substrate. Typical thicknesses of the three parts of the electrophotographic film are 0.005 inch for the substrate, 300 Angstroms for the ohmic layer and 3500 Angstroms for the coating.

The coating is panchromatic in the case of cadmium sulfide, the preferred material. Other materials can be used such as zinc sulfide and arsenic trisulfide, these having spectral responses which differ from that of cadmium sulfide in being selective of certain wavelengths. Projection light other than white is used for these latter films.

A thin surface film of an insulating hydrocarbon liquid is applied to the surface of the electrophotographic film prior to its entering the projection station to counter the effects of static electricity and to establish intimate contact and optical coupling between the photographic film and the electrophotographic film. The material also lubricates the film to prevent possible scratching.

With respect to the optical coupling, the index of refraction of the insulating hydrocarbon liquid, such as the Isopar mentioned herein, is more favorable for light transmission than air because it produces less refraction than air.

After toning the image either is fixed on the surface of the electrophotographic film or is transferred to a clear base film.

DESCRIPTION OF THE PREFERRED EMBODIMENTS

Figure 1:
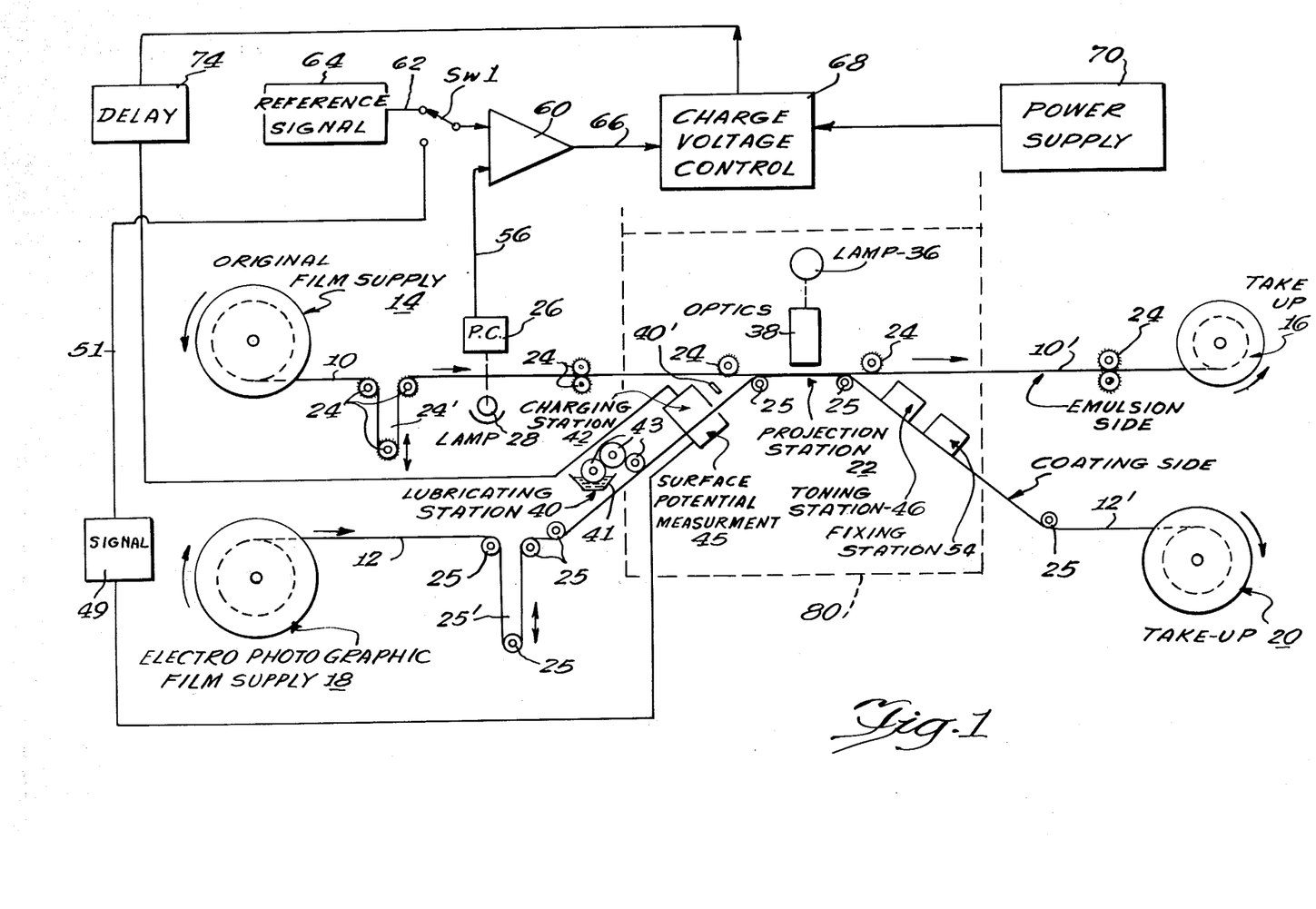
FIG. 1 is a block diagram of apparatus constructed in accordance with the invention.
Figure 2:
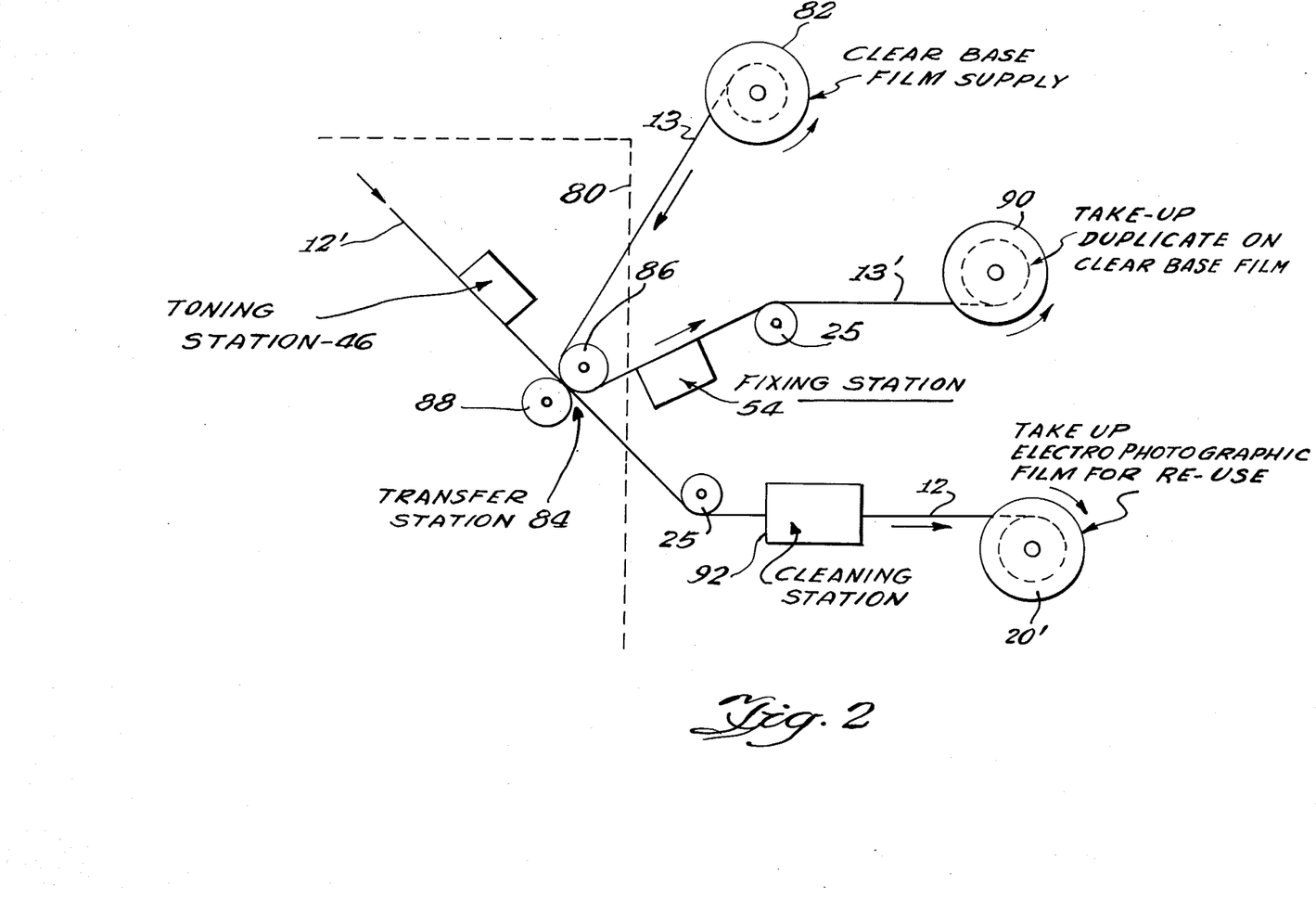
FIG. 2 is a modified form of the invention.

The apparatus of the invention is illustrated in FIGS. 1 and 2 diagrammatically, it being understood that the individual components which are intended to be illustrated are well-known to those skilled in the art. Likewise some of the details and refinements which are associated with such apparatus are not illustrated and should be understood to be present, such as for example, motors, tension controls, connections for electronic components, etc. The layout of the parts and their spaced relations to one another are not to be considered limited by the illustrations which spread everything along parallel paths to enable ready explanation.

The film 10 which carries the images that are to be reproduced is conventional silver halide photographic film that is provided in a supply at 14 in the apparatus. The film 10 normally is perforated and transported through the use of sprocket wheels such as shown at 24 in order to prevent any contact with the soft photographic emulsion. In transporting the film 10 through the apparatus, the emulsion side is arranged preferably to face the coating side of the electrophotographic film, as will be explained. The take-up reel and mechanism for the photographic film is shown at 16. The film 10 may be cinematographic, microfilm, microfiche, a series of stills, etc.

The electrophotographic film 12 is supplied from a suitable reel as shown at 18 and it may be transported by sprocket wheels as well, but since the film 12 is provided with an abrasion-resistant surface this is not necessary. Transport idlers are shown at 25. The film 12 comprises a unique article which has qualtities that particularly are useful in connection with the invention. The film 12 is based upon a strip of transparent polyester resin substrate about 0.005 inch thick and has an ohmic layer deposited on its surface and well-bonded thereto. The ohmic layer is made up of indium-tin oxide and is about 300 Angstroms thick and transparent. The ohmic layer has a coating of photoconductive material on its surface and hence the ohmic layer is sandwiched between the photoconductive coating and the substrate. The photoconductive coating is a sputter-deposited, wholly inorganic, highly oriented crystalline material in which the crystals are arranged parallel to one another and perpendicular to the plane of the substrate. The coating is transparent to a degree whereby it absorbs between 15 and 30% of white light. It has a quantum efficiency that is at least 100 times greater than those of known photoconductive materials. It has high speed, a resolution that is greater than known photographic film and is panchromatic. It has an almost infinite surface resistivity due to the formation of a barrier layer on the surface during the sputtering of the material. When deposited it is anisotropic in that is resistivity along the axes of the crystals, that is perpendicular to its surface, is very much less than its surface resistivity. It can be charged with a surface potential that gives a substantially greater field than known photoconductive materials and discharges to zero by white light, with an almost infinite intermediate grey scale.

The preferred material is cadmium sulfide of extremely high purity although zinc sulfide, arsenic trisulfide and mixtures of cadmium sulfide with zinc sulfide have produced excellent coatings. Different spectral characteristics result from different materials.

The supply of electrophotographic film is shown at 18. The film 12 passes through the apparatus with its coating side facing the emulsion side of the photographic film 10.

According to the invention, the electrophotographic film 12 first is charged at the charging station 42, then brought into contact with the film 10 at a projection station 22 where light from the lamp 36 is projected by way of a simple collimator or the like, designated optics 38, through the engaged films. The charged coating of the film 12 is imaged to provide a latent image which moves to the toning station 46 where it is toned and thereafter fixed at a fixing station 54 by some means such as a heat lamp. Spray coating may be used. Where the toner used is self-fixing, the fixing station 54 can be omitted. The film 12', now provided with the exact duplicate of the images on the photographic film 10 is taken up on the take-up reel 20. The reproduced film 10' is taken up on the take-up reel 16 and thereafter may be salvaged to recover the silver therefrom.

The charged film 12 has the charges so strongly bound thereto because of the nature of the coating that there is no loss of charge when the coating contacts the film 10. Furthermore, there will be little or no loss of the latent image when the films separate after leaving the projection station 22. The coated surface of the film 12 preferably is lubricated before being charged and passing through the projection station 22, this being done at a lubricating station 40. The material which is applied to the film is a liquid hydrocarbon that is insulating in character and serves several purposes. It wets the film 12 and causes intimate adherence of the film 10 thereto during passage of the contacting films through the projecting station 22. It prevents any possibility of scratching either film. It also is anti-static in that it prevents the buildup of static charges by virtue of the coming together and separating of the films so that there is no wiping off of the latent image of the electrophotographic film after it has been formed by such static charges. Finally, it is optically better than an intervening layer of air because its index of refraction is less than that of air.

In connection with the latter function of the liquid hydrocarbon, it should be understood that even the most intimate mechanical contact between two film surfaces is bound to include a thin layer of air. The presence of the hydrocarbon excludes air and substitutes a microscopic film of material therefor which has better optical transmission properties than air because diffusion, scattering and bending are decreased.

The preferred lubricating material is Isopar G, a liquid hydrocarbon that is made by the Exxon Company of Houston, Texas, and is a common solvent for toner. Thus there is complete compatibility between the lubricant and the toner at the toning station 46. The lubricant is applied at the lubricating station 40 by means of any suitable device, such as a fountain 41 with transfer rolls, the last one of which contacts the coating side of the film 12. Lubricant may be applied by spraying at the point 40' after the film has been charged.

Adjustment of the film strips to move fairly synchronously can be achieved by well-known means such as the adjustable loops 24' and 25' or the like.

The average density of the images on the film 10 can be detected by means of the lamp 28 and photocell 26 to provide a signal on the line 56 that can be compared with a signal from a reference source 64 appearing on the line 62 in the differential amplifier 60 to control the charging of the film 12. The output of the amplifier 60 appears at 66 and varies the output of the charge voltage control circuit 68 which is applied through delay circuit 74 to the charging apparatus, which may be a corona or similar device. The power supply for the charge voltage control circuit is shown at 70. The delay 74 is to give the image of the film 10 whose density is being measured sufficient time to reach the projection station 22, if necessary.

Since the film 12 has a sensitivity which varies in accordance with its surface potential, which is a concept unique to this film, the alternative to utilizing a reference signal is the use of a signal derived from a measurement of the surface potential of the charged film. Thus, the density of the image on the photographic film 10 is measured and compared with the surface potential of the film 12. When the potential on the film rises to a value which produces a signal out of the circuit 49 on the line 51 which has been predetermined to represent the ideal sensitivity of the film 12 for the particular lighting conditions of the lamp 36 to produce the density measured for the particular image, the charging stops. This form of the invention is a circuit different from that which uses a reference signal, but the circuitry block diagram readily is represented by moving the arm of the switch Sw 1 to the contact of the line 51.

The charging station 42, projection station 22 and the toning station 46 of FIG. 1 are enclosed all in a suitable housing indicated by the broken line 80 to maintain those elements involved in darkness.

The invention contemplates moving the film strips 10 and 12 intermittently or continuously.

It is known that there is considerably more information on exposed photographic film than can be derived from ordinary viewing, printing or projecting of the same. Computers and other sophisticated apparatus can synthesize this information by techniques which are not involved here. The invention herein does, however, derive quality information from the film and automatically produces a better quality duplicate than the original film. This is done by the measurement of density and relation of this information to image enhancement by controlling the charge as explained above. This is effected because of the variable sensitivity of the electrophotographic film 12.

The electrophotographic film 12 as used preferably is one in which there is a coating of inorganic material and most minerals have characteristic colors in crystalline form. For example, the color of cadmium sulfide is a light yellow. If a duplicate film 12' is made directly on the film coating by fixing the toned image, the making of prints from this film 12' does not pose any problems. If, on the other hand it is to be projected, the background will be yellow unless filters or film treatment are used. Furthermore, economical as this film 12 is, it is not as economical as clear base film of some polyester.

According to the invention, as illustrated in FIG. 2, the toned image may be transferred to a strip of clear base film and the electrophotographic film cleaned and reused over and over. The apparatus is quite similar to that shown in FIG. 1, in fact could be identical up to the toning station 46. At this point, instead of passing to the fixing station, the film 12' carrying the toned image passes to a transfer station 84 where the image is transferred to a strip 13 of clear base film that is stripped off a clear base film supply 82. The transfer station 84 is located in the darkened enclosure 80 and comprises a pair of pressure rollers 86 and 88 which bring the strips 13 and 12' into the nip of the rollers. The toner is picked up from the film 12' and passes to the fixing station 54 and thereafter is accumulated onto a take-up reel 90. Obviously, the toner should not be of the self-fixing type, or if it is, the process of drying should not take place until after transfer.

As for the film 12', after the toned image has been transferred, the film is cleaned in any suitable manner at the cleaning station 92. It could for example, be sprayed and/or rinsed by the same hydrocarbon used to lubricate the film at 40. This would dissolve whatever toner remained. There could be squeegee means, brushes to brush off dried toner, etc. A brilliant lamp could be used to discharge any remaining electrical charge on the coating. In any event, after cleaning, the film 12 is no different from the film which is shown being stripped off the supply reel 18 in FIG. 1 and hence can be used again. Since the electrophotographic film described above and which will be used in the invention does not become electrostatically fatigued, it can be reused as many times as its coating mechanically can withstand the wear thereon.

After economy, one of the benefits of transferring to blank film is that the toner, being made of carbon and resin particles, is inexpensive, certainly a lot cheaper than the silver halide emulsions of photographic film.

Variations are capable of being made without departing from the spirit or scope of the invention as defined in the attached claims.

What it is desired to secure by Letters Patent of the United States is:

1. Apparatus for duplicating images comprising,
    A. a supply of photographic film strip having a succession of developed images thereon and first means for transporting the film to first take-up means, B. a supply of electrophotographic film strip having a coating on the surface thereof, the coating formed of a wholly inorganic highly oriented crystalline photoconductive material, the crystals of which are arranged with their long axes parallel to one another and perpendicular to the surface on which deposited, the coating being electrically anisotropic and capable of accepting and retaining a charge and second means for transporting said electrophotographic film to second take-up means, C. a darkened chamber, the apparatus having means for guiding the both strips of film into the chamber and thereafter out of the chamber before moving to their respective take-up means, D. a charging station in the chamber and having means for charging said coating of said electrophotographic film strip uniformly while passing said charging station, E. said first and second transporting means including means for bringing the strips of films both into intimately engaged contact while in said chamber and moving at the same rate and in the same direction immediately after said electrophotographic film strip has passed the charging station, F. a projection station having means for projecting a beam of radiant energy through both film strips while in said chamber and in contact whereby to form a latent image on said electrophotographic film strip corresponding to the image or images of the photographic film strip located at said projection station and moving through the same, and G. a toning station in the said chamber and having means for toning the latent images produced on said electrophotographic film strip after passing through said projection station, said first and second transporting means including means for separating the strips of films immediately after the projection station and before said electrophotographic film passes through said toning station and means thereafter moving the respective films to said first and second take-up means.

2. The apparatus as claimed in claim 1 which includes a fixing station having means for fixing the toned images and the second transporting means moves the strip of said electrophotographic film through said fixing station after the toning station and before the second take-up means.

3. The apparatus as claimed in claim 1 which includes a supply of blank film, third take-up means, a toned image transfer station, a fixing station, third means for transporting the blank film from the supply to the transfer station and thence to the fixing station and thereafter to the third take-up means, the second transporting means including means moving said electrophotographic film from the toning station to the transfer station and into engagement with the blank film thereat to effect transfer of the toned image to the blank film before second take-up means.

4. Apparatus for duplicating the images on an elongate strip of photographic film having developed images onto an elongate strip of electrophotographic film, comprising, A. a supply of photographic film strip having a succession of developed images thereon and first means for transporting the film to first take-up means, B. a supply of electrophotographic film strip having a photoconductive coating thereon and second means for transporting the electrophotographic film to second take-up means, C. a darkened chamber, the apparatus having means for guiding the both strips of film into the chamber and thereafter out of the chamber before moving to their respective take-up means, D. a charging station in the chamber and having means for charging the coating of the electrophotographic film strip uniformly while passing said charging station, E. said first and second transporting means including means for bringing the strips of films both into intimately engaged contact while in said chamber and moving at the same rate and in the same direction after the electrophotographic film strip has passed the charging station, F. a projection station having means for projecting a beam of radiant energy through both film strips while in said chamber and in contact whereby to form a latent image on the electrophotographic film strip corresponding to the image or images of the photographic film strip located at said projection station and moving through the same, G. a toning station in the said chamber and having means for toning the latent images produced on the electrophotographic film strip after passing through said projection station, said first and second transporting means including means for separating the strips of films after the projection station and before the electrophotographic film passes through said toning station and means thereafter moving the respective films to said first and second take-up means and H. means are provided for lubricating the surface of the electrophotographic film which contacts the photographic film, said lubricating means being located before the electrophotographic film passes to said charging station.

5. The apparatus as claimed in claim 4, which includes a fixing station having means for fixing the toned images and the second transporting means moves the strip of electrophotographic film through said fixing station after the toning station and before the second take-up means.

6. The apparatus as claimed in claim 4 which includes a supply of blank film, third take-up means, a toned image transfer station, a fixing station, third means for transporting the blank film from the supply to the transfer station and thence to the fixing station and thereafter to the third take-up means, the second transporting means including means moving the electrophotographic film from the toning station to the transfer station and into engagement with the blank film thereat to effect transfer of the toned image to the blank film before the second take-up means.

7. The apparatus as claimed in claim 1, in which means are provided for measuring the density of the developed image on a given area along the length of said strip of photographic film at a location spaced ahead of said projection station and for adjusting the charged surface potential of that portion of said electrophotographic film strip which will meet said given area at said projection station to provide optimum conditions of duplication of said image onto said electrophotographic film strip.

8. The apparatus as claimed in claim 2, in which means are provided for measuring the density of the developed image on a given area along the length of said strip of photographic film at a location spaced ahead of said projection station and for adjusting the charged surface potential of that portion of said electrophotographic film strip which will meet said given area at said projection station to provide optimum conditions of duplication of said image onto said electrophotographic film strip.

9. The apparatus as claimed in claim 3, in which means are provided for measuring the density of the developed image on a given area along the length of said strip of photographic film at a location spaced ahead of said projection station and for adjusting the charged surface potential of that portion of said electrophotographic film strip which will meet said given area at said projection station to provide optimum conditions of duplication of said image onto said electrophotographic film strip.

10. A method of duplicating images carried on a strip of photographic film, comprising,
   A. providing an electrophotographic film having a coating of wholly inorganic, highly oriented crystalline photoconductive material on an ohmic layer which is in turn carried on a transparent polyester substrate, said electrophotographic film being transparent,
   B. charging said coating of said electrophotographic film in darkness and independently of the photographic film,
   C. moving said electrophotographic film strip after charging immediately into intimate face to face contacting engagement with said photographic film strip while maintaining the two strips in darkness,
   D. projecting a beam of radiant energy through both strips while so engaged to produce a latent electrostatic image of the photographic image on the coating, and
   E. separating the film strips and toning the latent image in darkness independently of the photographic film.

11. The method as claimed in claim 10 in which the toned image is fixed on said electrophotographic film.

12. The method as claimed in claim 10 in which the toned image is transferred to a blank film from said electrophotographic film and fixed on the blank film.

13. The method as claimed in claim 10 in which the emulsion side of the photographic film and the coating of said electrophotographic film are brought into contacting engagement.

14. Method of duplicating developed images carried on a strip of photographic film onto a strip of electrophotographic film which has a coating of wholly inorganic, oriented crystalline photoconductive material on an ohmic layer which is in turn carried on a transparent polyester substrate, the electrophotographic film being transparent, comprising
   A. charging the coating of the electrophotographic film in darkness and independently of the photographic film,
   B. moving the electrophotographic film strip after charging and the photographic film strip into intimate face to face contacting engagement while maintaining the two strips in darkness,
   C. projecting a beam of radiant energy through both strips while so engaged to produce a latent electrostatic image of the photographic image on the coating, and
   D. separating the film strips and toning the latent image in darkness independently of the photographic film, the coating side of the electrophotographic film strip being lubricated with an insulating hydrocarbon solvent before the said coating side is charged.

15. Method of duplicating developed images carried on a strip of photographic film onto a strip of electrophotographic film which has a coating of wholly inorganic, oriented crystalline photoconductive material on an ohmic layer which is in turn carried on a transparent polyester substrate, the electrophotographic film being transparent, comprising
   A. charging the coating of the electrophotographic film in darkness and independently of the photographic film,
   B. moving the electrophotographic film strip after charging and the photographic film strip into intimate face to face contacting engagement while maintaining the two strips in darkness,
   C. projecting a beam of radiant energy through both strips while so engaged to produce a latent electrostatic image of the photographic image on the coating, and
   D. separating the film strips and toning the latent image in darkness independently of the photographic film, the toned image being fixed on the electrophotographic film and the coating side of the electrophotographic film is lubricated with an insulating hydrocarbon solvent before said coating side is charged.

16. Method of duplicating developed images carried on a strip of photographic film onto a strip of electrophotographic film which has a coating of wholly inorganic, oriented crystalline photoconductive material on an ohmic layer which is in turn carried on a transparent polyester substrate, the electrophotographic film being transparent, comprising
   A. charging the coating of the electrophotographic film in darkness and independently of the photographic film,
   B. moving the electrophotographic film strip after charging and the photographic film strip into intimate face to face contacting engagement while maintaining the two strips in darkness,
   C. projecting a beam of radiant energy through both strips while so engaged to produce a latent electrostatic image of the photographic image on the coating, and
   D. separating the film strips and toning the latent image in darkness independently of the photographic film strip, the toned image being transferred to a blank film from the electrophotographic film strip and fixed on the blank film, the coating side of the electrophotographic film strip being lubricated with an insulating hydrocarbon solvent before said coating side is charged.

17. The method as claimed in claim 10 in which the density of the images of the photographic film strip are measured before the strips are moved into engagement and signals derived therefrom which are respectively proportional to said density, and in which said signals are used to control the amount of charge applied to the coating at locations which respectively come into contacting engagement with the strip of photographic film when the corresponding images are present, the amount of charge for any given location being adjusted to provide sensitivity of the coating for optimum duplication of the corresponding image.

18. The method as claimed in claim 11 in which the density of the images of the photographic film strip are measured before the strips are moved into engagement and signals derived therefrom which are respectively proportional to said density, and in which said signals are used to control the amount of charge applied to the coating at locations which respectively come into contacting engagement with the strip of photographic film when the corresponding images are present, the amount of charge for any given location being adjusted to provide sensitivity of the coating for optimum duplication of the corresponding image.

19. The method as claimed in claim 12 in which the density of the images of the photographic film strip are measured before the strips are moved into engagement and signals derived therefrom which are respectively proportional to said density, and in which said signals are used to control the amount of charge applied to the coating at locations which respectively come into contacting engagement with the strip of photographic film when the corresponding images are present, the amount of charge for any given location being adjusted to provide sensitivity of the coating for optimum duplication of the corresponding image.

20. The method as claimed in claim 17 in which each signal derived from an image is compared with a predetermined reference signal to determine the amount of said charge.

21. A contact film duplicator for duplicating the images of an elongate strip of photographic film comprising,
   A. a source of electrophotographic film strip having a coating of a sputtered wholly inorganic highly oriented crystalline photoconductive material, the crystals of which are arranged with their long axes parallel to one another and perpendicular to the surface on which deposited, the coating being electrically anisotropic and capable of accepting and retaining a charge,
   B. means for progressively bringing a limited area of an elongate strip of imaged photographic film into face to face engaged contact with identical area of an elongate strip of said electrophotographic film in a continuous progression of such limited areas along the lengths of the respective films and including means for maintaining the films in darkness at their contacting areas,
   C. means for charging each said limited area of said electrophotographic film in darkness before it is brought into contact with its counterpart area of the photographic film, said charging means and said contacting means being located one relative to the other whereby the charged electrophotographic film and the photographic film are brought into engagement directly from said charging means,
   D. means for projecting light through the films from the side of the photographic film to produce a latent duplicate image of the limited area of the photographic film on said electrophotographic film while the limited areas are in engagement,
   E. means for moving the films apart immediately after the latent image has been formed and the films pass said projecting means,
   F. means for toning the latent image in darkness after the films have moved apart, and
   G. means for accumulating said electrophotographic film after the operation of the toning means.

22. The duplicator as claimed in claim 21 in which means are provided for fixing the toned image after it has been toned.

23. The duplicator as claimed in claim 21 in which an elongate strip of blank film is provided and means are provided to bring the blank film into progressive engagement with said electrophotographic film after the operation of the toning means to transfer the toned images to said blank film, and including means for fixing the transferred images onto the blank film and means to accumulate the blank film thereafter.

24. The duplicator as claimed in claim 21 which includes means to measure and derive a signal related to the density of the limited areas of the photographic film before same are brought into contact with said electrophotographic film and said charging means have means responsive to the signal to enhance the image duplicated on said electrophotographic film by adjustment of the amount of charge applied to said electrophotographic film.

25. A contact film duplicator for duplicating the images of an elongate strip of photographic film onto another medium in a continuous process which comprises,
   A. means for progressively bringing a limited area of an elongate strip of imaged photographic film into face to face engaged contact with identical area of an elongate strip of electrophotographic film in a continuous progression of such limited areas along the lengths of the respective films and including means for maintaining the films in darkness at their contacting areas,
   B. means for charging each said limited area of the electrophotographic film in darkness before it is brought into contact with its counterpart area of the photographic film, said charging means and said contacting means being located one relative to the other whereby the charged electrophotographic film and the photographic film are brought into engagement directly from said charging means,
   C. means for projecting light through the films from the side of the photographic film to produce a latent duplicate image of the limited area of the photographic film on the electrophotographic film,
   D. means for moving the films apart immediately after they have been engaged and the latent image has been formed,
   E. means for toning the latent image in darkness after the films have moved apart,
   F. means for accumulating the electrophotographic film after the operation of the toning means, and
   G. means for lubricating the surface of the electrophotographic film which contacts the photographic film, said lubricating means being located before the location at which the photographic film and electrophotographic film are brought into contact.

26. Apparatus for duplicating the images on an elongate strip of photographic film having developed images onto an elongate strip of electrophotographic film, comprising
   A. a supply of photographic film strip having a succession of developed images thereon and first means for transporting the film to first take-up means, B. a supply of electrophotographic film strip having a photoconductive coating thereon and second means for transporting the electrophotographic film to second take-up means, C. a darkened chamber, the apparatus having means for guiding the both strips of film into the chamber and thereafter out of the chamber before moving to their respective take-up means, D. a lubricating station and means for lubricating the photoconductive coating surface of the electrophotographic film with an insulating liquid, E. a charging station in the chamber and having means for charging the photoconductive coating of the electrophotographic film strip uniformly while passing said charging station and subsequent to the lubrication of said photoconductive surface, F. said first and second transporting means including means for bringing the strips of films both into intimately engaged contact while in said chamber and moving at the same rate and in the same direction after the electrophotographic film strip has passed the charging station, G. a projection station having means for projecting a beam of radiant energy through both film strips while in said chamber and in contact whereby to form a latent image on the electrophotographic film strip corresponding to the image or images of the photographic film strip located at said projection station and moving through the same, and H. a toning station in the said chamber and having means for toning the latent images produced on the electrophotographic film strip after passing through said projection station, said first and second transporting means including means for separating the strips of films after the projection station and before the electrophotographic film passes through said toning station and means thereafter moving the respective films to said first and second take-up means.

27. The apparatus as claimed in claim 26 which includes a fixing station having means for fixing the toned images and the second transporting means moves the strip of electrophotographic film through said fixing station after the toning station and before the second take-up means.

28. The apparatus as claimed in claim 26 which includes a supply of blank film, third take-up means, a toned image transfer station, a fixing station, third means for transporting the blank film from the supply to the transfer station and thence to the fixing station and thereafter to the third take-up means, the second transporting means including means moving the electrophotographic film from the toning station to the transfer station and into engagement with the blank film thereat to effect transfer of the toned image to the blank film before second take-up means.

29. The apparatus as claimed in claim 26 in which means are provided for measuring the density of the developed image on a given area along the length of said strip of photographic film at a location spaced ahead of said projection station, means for measuring the surface charge potential applied to that portion of the electrophotographic film strip which will meet said given area at said projection station, said respective measuring means providing respective signals for comparison to provide an adjusting signal and means responsive to said adjusting signal for controlling the charging device so that the surface charge potential reaches a level to provide optimum conditions of duplication of said image onto said electrophotographic film strip.

30. A contact film duplicator for duplicating the images of an elongate strip of photographic film onto another medium in a continuous process which comprises A. means for progressively bringing a limited area of an elongate strip of imaged photographic film into face to face engaged contact with identical area of an elongate strip of electrophotographic film in a continuous progression of such limited areas along the lengths of the respective films and including means for maintaining the films in darkness at their contacting areas, B. means for charging each said limited area of the electrophotographic film in darkness before it is brought into contact with its counterpart area of the photographic film, C. means for lubricating the surface of the electrophotographic film which contacts the photographic film before charging of said surface, said lubricating means being located before the location at which the electrophotographic film is charged.

D. means for projecting light through the films from the side of the photographic film to produce a latent duplicate image of the limited area of the photographic film on the electrophotographic film, E. means for moving the films apart immediately after they have been engaged and the latent image has been formed, F. means for toning the latent image in darkness after the films have moved apart, and G. means for accumulating the electrophotographic film after the operation of the toning means.

31. The duplicator as claimed in claim 30 in which means are provided for fixing the toned image after it has been toned.

32. The duplicator as claimed in claim 30 in which an elongate strip of blank film is provided and means are provided to bring the blank film into progressive engagement with the electrophotographic film after the operation of the toning means to transfer the toned images to said blank film, and including means for fixing the transferred images onto the blank film and means to accumulate the blank film thereafter.

33. The duplicator as claimed in claim 30 which includes means to measure and derive a signal related to the density of the limited areas of the photographic film before same are brought into contact with the electrophotographic film and said charging means have means responsive to the signal to enhance the image duplicated on the electrophotographic film by adjustment of the amount of charge applied to said electrophotographic film.

34. Method of duplicating developed images carried on a strip of photographic film onto a strip of electrophotographic film which has a coating of wholly inorganic, oriented crystalline photoconductive material on an ohmic layer which is in turn carried on a transparent polyester substrate, the electrophotographic film being transparent, comprising A. applying a lubricating coating of an insulating hydrocarbon solvent to the photoconductive coating side of the electrophotographic film B. then charging the lubricated coating of the electrophotographic film in darkness and independently of the photographic film, C. moving the thus charged lubricated electrophotographic film strip and the photographic film strip into intimate face to face contacting engagement while maintaining the two strips in carkness, D. projecting a beam of radiant energy through both strips while so engaged to produce a latent electrostatic image of the photographic image on the coating, and E. separating the film strips and toning the latent image in darkness independently of the photographic film.

35. The method as claimed in claim 34 in which the toned image is fixed on the electrophotographic film.

36. The method as claimed in claim 34 in which the toned image is transferred to a blank film from the electrophotographic film and fixed on the blank film.

37. The method as claimed in claim 34 in which the density of the images of the photographic film strip are measured before the strips are moved into engagement and signals derived therefrom which are respectively proportional to said density are compared with signals representing charge on the coating to provide signals which are used to control the amount of charge applied to the coating at locations which respectively come into contacting engagement with the strip of photographic film when the corresponding images are present, the amount of charge for any given location being adjusted in response to said last mentioned signals to a level required to provide sensitivity of the coating for optimum duplication of the corresponding image.

38. The method as claimed in claim 35 in which the density of the images of the photographic film strip are measured before the strips are moved into engagement and signals derived therefrom which are respectively proportional to said density are compared with signals representing charge on the coating to provide signals which are used to control the amount of charge applied to the coating at locations which respectively come into contacting engagement with the strip of photographic film when the corresponding images are present, the amount of charge for any given location being adjusted in response to said last mentioned signals to a level required to provide sensitivity of the coating for optimum duplication of the corresponding image.

39. The method as claimed in claim 36 in which the density of the images of the photographic film strip are measured before the strips are moved into engagement and signals derived therefrom which are respectively proportional to said density are compared with signals representing charge on the coating to provide which are used to control the amount of charge applied to the coating at locations which respectively come into contacting engagement with the strip of photographic film when the corresponding images are present, the amount of charge for any given location being adjusted in response to said last mentioned signals to a level required to provide sensitivity of the coating for optimum duplication of the corresponding image.

* * * * *